United States Patent
Ghannam et al.

(10) Patent No.: US 9,558,597 B2
(45) Date of Patent: Jan. 31, 2017

(54) ROAD EMERGENCY ACTIVATION

(71) Applicant: Ford Global Technologies, LLC, Dearborn, MI (US)

(72) Inventors: Mahmoud Yousef Ghannam, Canton, MI (US); Jayagopal Appukutty, Troy, MI (US); Abraham G. Philip, Rochester Hills, MI (US); David James Tippy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/964,790

(22) Filed: Dec. 10, 2015

(65) Prior Publication Data

US 2016/0104327 A1    Apr. 14, 2016

Related U.S. Application Data

(63) Continuation of application No. 14/512,565, filed on Oct. 13, 2014, now Pat. No. 9,238,465.

(51) Int. Cl.
*G07C 5/00* (2006.01)
*B60W 50/02* (2012.01)
*G07C 5/02* (2006.01)
*G07C 5/08* (2006.01)

(52) U.S. Cl.
CPC .......... *G07C 5/006* (2013.01); *B60W 50/0205* (2013.01); *G07C 5/02* (2013.01); *G07C 5/08* (2013.01); *B60W 2050/021* (2013.01)

(58) Field of Classification Search
CPC ....... G07C 5/02; G07C 5/006; B60W 50/0205
See application file for complete search history.

(56) References Cited

U.S. PATENT DOCUMENTS

| | | | |
|---|---|---|---|
| 5,974,354 A * | 10/1999 | Janecke | F16H 59/70 477/124 |
| 6,242,873 B1 * | 6/2001 | Drozdz | B60K 6/46 180/65.1 |
| 6,654,910 B1 * | 11/2003 | Eibach | G05B 19/0428 701/31.6 |
| 6,745,151 B2 * | 6/2004 | Marko | G07C 5/0808 701/31.4 |
| 7,502,718 B2 * | 3/2009 | Kanamaru | G07C 5/008 701/31.4 |

(Continued)

FOREIGN PATENT DOCUMENTS

WO    2014102283 A2    7/2014

OTHER PUBLICATIONS

Carley, "Engine Control Module: The Brains of the Operation", www.counterman.com/Article/109053, Jan. 16, 2013 (1 page).

(Continued)

*Primary Examiner* — Thomas Tarcza
*Assistant Examiner* — Alex C Dunn
(74) *Attorney, Agent, or Firm* — Frank MacKenzie; Bejin Bieneman PLC

(57) ABSTRACT

A vehicle system includes a processing device programmed to monitor an operating state of a vehicle and the operation of at least one subsystem module. Depending on the operating state of the vehicle, the processing device can detect a subsystem module failure. If a failure is detected, the processing device can perform a remedial action. The remedial action taken may be based on the type of failure detected.

17 Claims, 2 Drawing Sheets

(56) References Cited

U.S. PATENT DOCUMENTS

| | | | |
|---|---|---|---|
| 7,522,979 B2 | 4/2009 | Pillar | |
| 7,558,655 B2* | 7/2009 | Garg | B60K 6/32 |
| | | | 701/32.8 |
| 7,912,602 B2* | 3/2011 | Sells | G06Q 30/0641 |
| | | | 701/31.7 |
| 8,116,915 B2* | 2/2012 | Kempton | B60L 11/1824 |
| | | | 180/65.1 |
| 8,140,358 B1* | 3/2012 | Ling | G06Q 40/08 |
| | | | 340/439 |
| 8,311,858 B2* | 11/2012 | Everett | G06Q 40/08 |
| | | | 246/45 |
| 8,560,165 B2* | 10/2013 | Salman | G05B 23/0283 |
| | | | 701/31.5 |
| 2009/0187781 A1 | 7/2009 | Gronemeier et al. | |
| 2013/0151097 A1* | 6/2013 | Deurloo | F16H 61/16 |
| | | | 701/62 |
| 2013/0282238 A1* | 10/2013 | Ricci | G06F 3/0484 |
| | | | 701/41 |

OTHER PUBLICATIONS

Gu et al., "Distributed vehicle body electric/electronic system architecture with central coordination control", Abstract Only taken from 2012 *Journal Citation Records®, Thomson Reuters*, 2013 (1 page); entire article can be found at: Proceedings of the Institution of Mechanical Engineers, Part D: Journal of Automobile Engineering, Feb. 1, 2010, vol. 224, No. 2, pp. 189-199.

Miller et al., "Adventures in Automotive Networks and Control Units", Jul. 23, 2013 (101 pages).

* cited by examiner

ROAD EMERGENCY ACTIVATION

CROSS-REFERENCE TO RELATED APPLICATION

This application claims priority to U.S. Ser. No. 14/512,565 titled "ROAD EMERGENCY ACTIVATION" and filed on Oct. 13, 2014, the contents of which are hereby incorporated by reference in their entirety.

BACKGROUND

Redundancy in electrical systems is one way to mitigate problems in case one of the systems fails. Redundancy, in the context of electrical systems, typically involves having multiple systems providing the same or similar outputs. That way, if one system fails, the other systems that rely on the failed system may still operate, although sometimes in a diminished capacity.

DETAILED DESCRIPTION

Vehicles rely on more and more electrical systems. Even redundant electrical systems cannot mitigate certain types of failures, such as a power loss affecting both the primary and backup system. Moreover, each backup vehicle system is generally dedicated to a particular primary vehicle system or a primary vehicle system will act as a backup to another primary vehicle system. Such backup systems, however, do not globally prioritize some primary systems over others.

An example vehicle system that can mitigate vehicle power failures affecting multiple primary systems, backup systems, or both, includes a processing device programmed to monitor an operating state of the vehicle and the operation of at least one subsystem module (i.e., the primary subsystem). Depending on the operating state of the vehicle, the processing device can detect a subsystem module failure. If a failure is detected, the processing device can perform a remedial action. The remedial action taken may be based on the type of failure detected.

The elements shown may take many different forms and include multiple and/or alternate components and facilities. The example components illustrated are not intended to be limiting. Indeed, additional or alternative components and/or implementations may be used.

Figure 1:
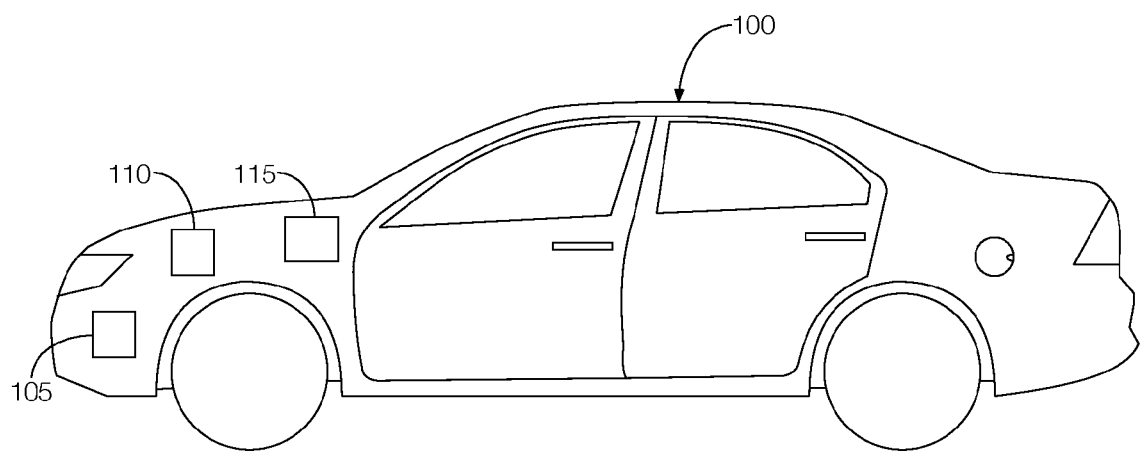
FIG. 1 illustrates an example vehicle incorporating a vehicle system for addressing subsystem failures.

As illustrated in FIG. 1, the vehicle 100 includes multiple primary subsystems 105, a primary power unit 110, and a vehicle system 115. The vehicle system 115 may be programmed to mitigate a primary subsystem 105 failure. As discussed in greater detail below with regard to FIGS. 2 and 3, the vehicle system 115 may detect a primary subsystem 105 failure. Examples of primary subsystem 105 failures may include a power loss, an abnormal value detected, or a fault code.

In some possible implementations, the vehicle system 115 may be programmed to monitor the operating state of the vehicle 100 in addition to monitoring the primary subsystems 105 for potential failures. Example vehicle 100 operating states may include whether the vehicle 100 is turned on, moving, stopped, accelerating, decelerating, turning, in "park", in a "drive" gear, in a "reverse" gear, etc. The vehicle system 115 may determine the operating state by considering any number of variables such as whether the wheels are rotating, whether the engine is turned on, based on the current or voltage status of the primary power unit 110, etc.

The vehicle system 115 may be programmed to look for primary subsystem 105 failures at various times, such as any time the vehicle 100 is moving or otherwise turned on and not in the "park" gear state. If multiple primary subsystem 105 failures are detected, the vehicle system 115 may determine which failed primary subsystem 105 takes priority. Depending on the nature of the failure, the vehicle system 115 may take a remedial action in order of priority. In some instances, the vehicle system 115 may even perform some operations that would otherwise be performed by the failed subsystem. Other types of remedial actions may include turning hazard lights on and limiting the maximum vehicle speed.

The primary subsystems 105 may be configured to control various vehicle operations. Examples of primary subsystems 105 may include an anti-lock braking system (ABS), a powertrain control module (PCM), a restraint control module (RCM), an emergency telematics module (eCall), an accessory protocol interface module (APIM), or the like.

Although illustrated as a sedan, the vehicle 100 may include any passenger or commercial automobile such as a car, a truck, a sport utility vehicle, a crossover vehicle, a van, a minivan, a taxi, a bus, etc. In some possible approaches, the vehicle 100 is an autonomous vehicle configured to operate in an autonomous (e.g., driverless) mode, a partially autonomous mode, and/or a non-autonomous mode.

Figure 2:
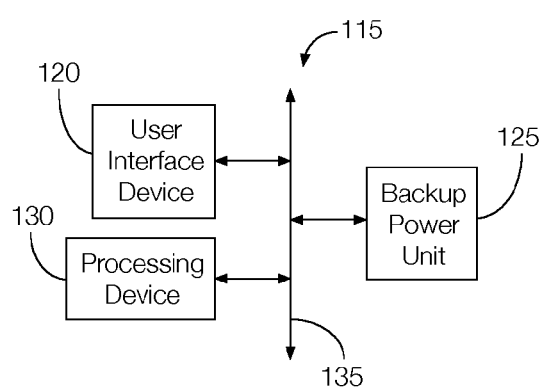
FIG. 2 is a block diagram showing examples components of the vehicle system of FIG. 1.

FIG. 2 is a block diagram showing example components of the vehicle system 115 discussed above. As illustrated, the vehicle system 115 includes a user interface device 120, a backup power unit 125, and a processing device 130. Each of these components may be programmed to communicate with one another and with the primary subsystems 105 over a communication network bus 135. An example communication network bus 135 may include a controller area network (CAN) bus.

The user interface device 120 may be configured to present information to a user, such as a driver, during operation of the vehicle 100. Moreover, the user interface device 120 may be configured to receive user inputs. Thus, the user interface device 120 may be located in the passenger compartment of the vehicle 100. In some possible approaches, the user interface device 120 may include a touch-sensitive display screen.

The backup power unit 125 may include a battery or other power source configured to provide electrical energy to one or more of the primary subsystems 105. The backup power unit 125 may be programmed to provide power to one of the primary subsystems 105 in response to a control signal received from the processing device 130. For instance, the backup power unit 125 may receive the control signal after the processing device 130 has detected that one or more of the primary subsystems 105 has lost power from the primary power unit 110.

The processing device 130 may be programmed to monitor the operating state of the vehicle 100, and depending on the operating state, monitor the operation of the primary subsystems 105. For example, while the operating state reflects that the vehicle 100 is turned on and not in a "park" gear position, the processing device 130 may monitor the status of each primary subsystem 105. If one or more of the subsystems fails, the processing device 130 may be programmed to perform a remedial action. The remedial action performed may be related to the type of subsystem failure.

For instance, the processing device 130 may be programmed to determine whether one or more primary subsystems 105 lost power. If such a situation, the remedial action may include commanding the backup power unit 125 to provide electrical energy to the failed primary subsystem 105. Another type of failure detectable by the processing device 130 may include a fault code or abnormal signal output by the failed primary subsystem 105. To detect a fault code, the processing device 130 may monitor communications along the communication bus 135. To detect an abnormal signal output, the processing device 130 may define the basic functions of each of the primary subsystems and assess differences between the signal outputs relative to the basic functions. In response to detecting the fault code or abnormal signal output, the processing device 130 may be programmed to intercept communications addressed to the failed primary subsystem 105 and transmitted over the communication bus. The processing device 130 may be further programmed to process the intercepted communications and even perform operations associated with the failed primary subsystem 105. The processing device 130 may, e.g., apply default or calibration values so that it may act, in at least a limited capacity, as the failed primary subsystem 105.

The processing device 130 may be further programmed to assign a priority to each of the primary subsystems 105. The priority may be determined based on which primary subsystems are deemed "critical" to vehicle operation. A "critical" subsystem may be defined as a subsystem that other subsystems rely upon. If multiple primary subsystems 105 fail, the processing device 130 may perform remedial actions according to the priority. That is, remedial actions associated with failed higher priority subsystems will be performed before remedial actions associated with failed lower priority subsystems.

In some possible approaches, the processing device 130 may be programmed to perform remedial actions in accordance with a user input provided via the user interface device 120. After detecting a failed primary subsystem 105, the processing device 130 may command the user interface device 120 to alert a vehicle occupant of the failure. The alert may include an audible alert, a visual alert, or both. The processing device 130 may further prompt the vehicle occupant to provide a user input, and the processing device 130 may be programmed to assume certain operations of the failed primary subsystem 105 in accordance with the user input provided.

In some possible approaches, the processing device 130 may be programmed to operate in multiple modes. For instance, the processing device 130 may be programmed to operate in a stand-by mode until a failure is detected. In one possible implementation, the processing device 130 may detect the subsystem failure while operating in the stand-by mode and "wake-up" to perform additional operations after subsystem failure has been detected. Alternatively, the processing device 130 may be programmed to "wake" from the stand-by mode in response to a power failure.

Figure 3:
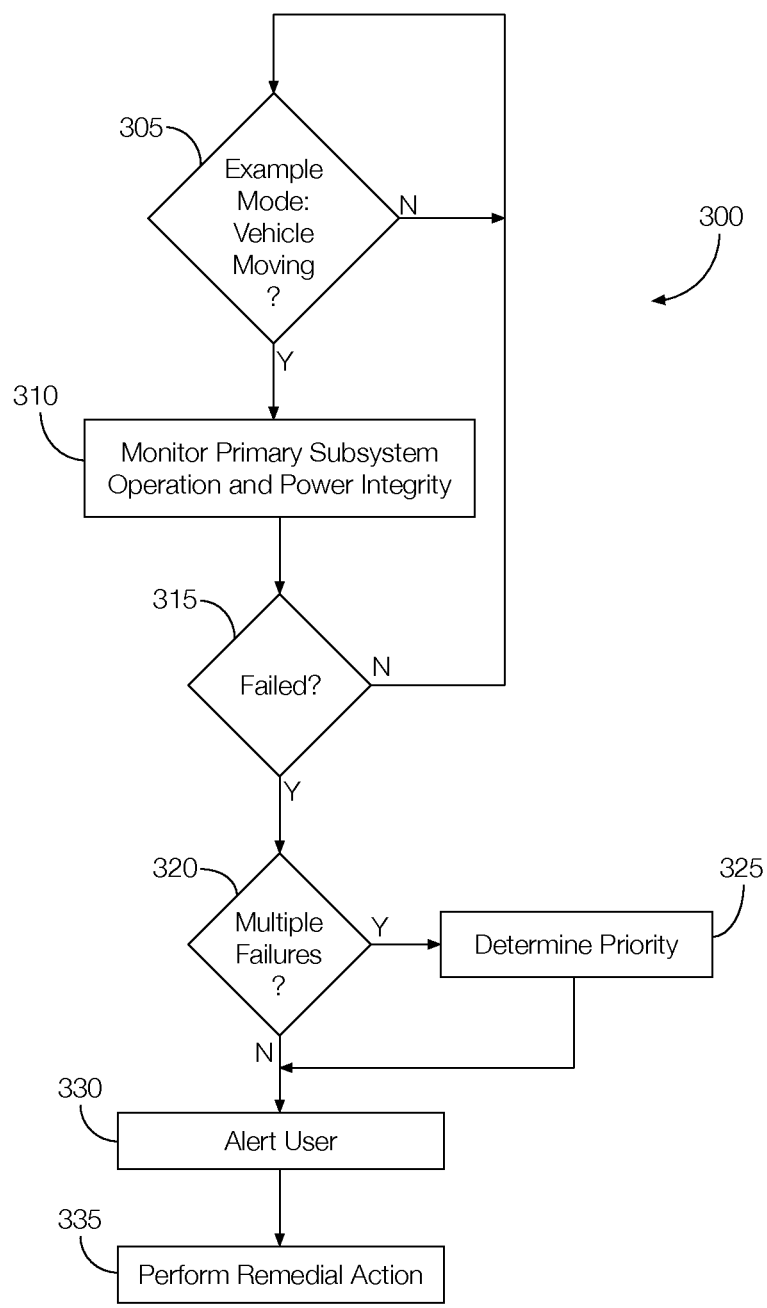
FIG. 3 is a flowchart of an example process that may be executed by the vehicle system to address subsystem failures.

FIG. 3 is a flowchart of an example process 300 that may be implemented by the vehicle system 115 to mitigate issues caused by certain primary subsystem 105 failures. The process may be executed while the vehicle 100 is turned on.

At decision block 305, the processing device 130 may monitor the operating state of the vehicle 100. The operating state may include whether the vehicle 100 is turned on, moving, stopped, accelerating, decelerating, turning, in "park", in a "drive" gear, in a "reverse" gear, etc. The operating state may be determined by considering any number of variables such as whether the wheels are rotating, whether the engine is turned on, based on the current or voltage status of the primary power unit 110, etc. If the operating state suggests that the vehicle 100 is moving, the process 300 may continue at block 310. Otherwise, the process 300 may continue to execute block 305 until movement of the vehicle 100 is detected.

At block 310, the processing device 130 may monitor the operation of at least one primary subsystem 105. The primary subsystems 105 monitored by the processing device 130 may be configured to control various vehicle operations. Examples of primary subsystems 105 may include an antilock braking system (ABS), a powertrain control module (PCM), a restraint control module (RCM), an emergency telematics module (eCall), an accessory protocol interface module (APIM), or the like.

At decision block 315, the processing device 130 may determine whether one or more primary subsystems 105 has failed. Detecting the failure may include detecting a power loss, fault code, or abnormal signal output by the primary subsystem 105. If a failure is detected, the process 300 may continue at block 320. Otherwise, the process 300 may continue at block 305.

At decision block 320, the processing device 130 may determine whether multiple primary subsystems 105 have failed. If so, the process 300 may continue at block 325. Otherwise, the process 300 may proceed to block 330.

At block 325, the processing device 130 may determine the priority of the failed primary subsystems 105. For instance, the processing device 130 may determine which of the failed primary subsystems 105 has the highest priority, which has the lowest, and where any others fall relative to those with the highest and lowest priorities.

At block 330, the processing device 130 may alert the vehicle operator of the primary subsystem failure. Moreover, at block 330, the processing device 130 may determine whether to perform the operations of the failed primary subsystem 105. If the processing device 130 is to perform the operations of the failed primary subsystem, the processing device 130 may further prompt the vehicle operator, via the user interface device 120, to indicate whether the processing device 130 should automatically apply basic parameters associated with the failed primary subsystem 105 or if the user wishes to provide such parameters via a user input.

At block 335, the processing device 130 may take a remedial action to mitigate problems caused by the failed primary subsystems 105. The type of remedial action may be based on the type of failure detected and the type of user input, if any, provided at block 330. For instance, if the failure includes a power loss, the processing device 130 may command the back-up power unit to provide power to the failed primary subsystem 105. In some instances, the processing device 130 may perform various operations associated with the failed primary subsystem 105 using, e.g., default values or user inputs received via the user interface device 120. Moreover, if multiple primary subsystems 105 have failed, the processing device 130 may perform the remedial actions in the order of the priority determined at block 325.

The process 300 may end after block 335. In some instances, the process 300 may continually execute until the vehicle 100 is turned off.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
a processing device programmed to monitor an operating state of a vehicle and operation of at least one subsystem module, wherein the processing device is further programmed to assign a priority to each subsystem module, detect a subsystem module failure, and perform a remedial action in response to detecting the subsystem module failure and in accordance with the operating state of the vehicle and the priority.

2. The vehicle system of claim 1, wherein the subsystem module failure includes a power failure.

3. The vehicle system of claim 2, wherein the remedial action includes providing power to the subsystem module associated with the subsystem module failure.

4. The vehicle system of claim 2, further comprising a power unit configured to provide electrical energy to at least one subsystem module.

5. The vehicle system of claim 4, wherein the remedial action includes the processing device commanding the power unit to provide electrical energy to the subsystem module associated with the subsystem module failure.

6. The vehicle system of claim 1, wherein the subsystem module failure includes a fault code output by the subsystem module associated with the subsystem module failure.

7. The vehicle system of claim 6, wherein the processing device is programmed to detect the fault code.

8. The vehicle system of claim 7, wherein the processing device is programmed to intercept inter-vehicle messages transmitted to the subsystem module that output the fault code.

9. The vehicle system of claim 7, wherein the processing device is programmed to perform operations associated with the subsystem module that output the fault code.

10. The vehicle system of claim 1, wherein the processing device is programmed to command a user interface device to alert a vehicle occupant of the subsystem module failure.

11. A method comprising:
monitoring an operating state of a vehicle;
monitoring operation of at least one subsystem module;
detecting a subsystem module failure; and
performing a remedial action in response to detect the subsystem module failure and in accordance with the operating state of the vehicle, wherein performing the remedial action includes performing, via a processing device, operations associated with the subsystem module associated with the subsystem module failure.

12. The method of claim 11, wherein performing the remedial action includes commanding a power unit to provide power to the subsystem module associated with the subsystem module failure.

13. A vehicle system comprising:
a processing device programmed to monitor an operating state of a vehicle and operation of at least one subsystem module, wherein the processing device is further programmed to detect a subsystem module failure and perform a remedial action in response to detecting the subsystem module failure and in accordance with the operating state of the vehicle,
wherein the subsystem module failure includes a fault code output by the subsystem module associated with the subsystem module failure, and
wherein the processing device is programmed to detect the fault code and intercept inter-vehicle messages transmitted to the subsystem module that output the fault code.

14. The vehicle system of claim 13, wherein the subsystem module failure includes a power failure.

15. The vehicle system of claim 14, wherein the remedial action includes providing power to the subsystem module associated with the subsystem module failure.

16. The vehicle system of claim 13, wherein the processing device is programmed to perform operations associated with the subsystem module that output the fault code.

17. The vehicle system of claim 13, wherein the processing device is programmed to command a user interface device to alert a vehicle occupant of the subsystem module failure.

* * * * *